United States Patent
Bourgeais et al.

(10) Patent No.: US 10,733,455 B2
(45) Date of Patent: Aug. 4, 2020

(54) METHOD AND SYSTEM FOR CONTROLLING A PHYSICAL OBJECT TO BE SHARED BY SEVERAL POTENTIAL USERS

(71) Applicant: STMicroelectronics (Grand Ouest) SAS, Delarue (FR)

(72) Inventors: Jerome Bourgeais, Le Mans (FR); Michel Catrouillet, Le Mans (FR); Jean Philippe Romain, La Chapelle Saint Au (FR); Laurent Conseil, Monce en Belin (FR)

(73) Assignee: STMICROELECTRONICS (GRAND OUEST) SAS, Delarue (FR)

( * ) Notice: Subject to any disclaimer, the term of this patent is extended or adjusted under 35 U.S.C. 154(b) by 0 days.

(21) Appl. No.: 15/692,777

(22) Filed: Aug. 31, 2017

(65) Prior Publication Data

US 2018/0276481 A1    Sep. 27, 2018

(30) Foreign Application Priority Data

Mar. 21, 2017  (FR) ...................... 17 52301

(51) Int. Cl.
*G05B 19/048*      (2006.01)
*G06K 9/00*        (2006.01)
(Continued)

(52) U.S. Cl.
CPC .......... *G06K 9/00771* (2013.01); *E05G 1/10* (2013.01); *G05B 19/048* (2013.01); *G06K 9/66* (2013.01); *G07C 9/00912* (2013.01); *G08B 25/009* (2013.01); *B65F 2210/1443* (2013.01); *B65F 2210/168* (2013.01); *E05Y 2400/44* (2013.01); *E05Y 2400/66* (2013.01);
(Continued)

(58) Field of Classification Search
CPC ...... G06K 9/007771; G06K 9/66; E05G 1/00; G05B 19/048; G06Q 10/06
USPC ...................................... 340/539.13
See application file for complete search history.

(56) References Cited

U.S. PATENT DOCUMENTS 6,323,782 B1 * 11/2001 Stephens ............ G07C 9/00103
                                                  340/10.31
9,754,467 B1 *  9/2017 Harrison ................. F41A 23/18
(Continued)

FOREIGN PATENT DOCUMENTS

CN      102293047 A      12/2011
CN      105723425 A       6/2016
(Continued)

*Primary Examiner* — Kam Wan Ma
(74) *Attorney, Agent, or Firm* — Slater Matsil, LLP (57) ABSTRACT

An embodiment method for controlling a physical object to be shared by several potential users and in an enclosure in an open state or in a closed state includes detecting a presence or an absence of the object in the enclosure in the closed state via a first wireless link between the object and a reader situated in the enclosure, the first wireless link being contained in the enclosure in the closed state. The method also includes transmitting a first information item representative of the presence or of the absence of the object in the enclosure to a computer server via a second link and an internet network, the computer server being accessible via a website configured to be managed by an administrator.

23 Claims, 4 Drawing Sheets

(51) Int. Cl.
    *G07C 9/00*            (2020.01)
    *E05G 1/10*            (2006.01)
    *G06K 9/66*           (2006.01)
    *G08B 25/00*          (2006.01)
    *G06Q 10/06*         (2012.01)

(52) U.S. Cl.
    CPC ..... *E05Y 2400/80* (2013.01); *E05Y 2900/602* (2013.01); *G06Q 10/06* (2013.01)

(56) References Cited

U.S. PATENT DOCUMENTS

| | | | |
|---|---|---|---|
| 2003/0079129 A1* | 4/2003 | Lindsay | A47G 29/141 |
| | | | 713/176 |
| 2005/0165700 A1* | 7/2005 | Karthik | G06F 21/32 |
| | | | 705/67 |
| 2007/0206838 A1* | 9/2007 | Fouquet | G06F 21/32 |
| | | | 382/115 |
| 2010/0141435 A1 | 6/2010 | Breed | |
| 2010/0176917 A1 | 7/2010 | Bacarella | |
| 2010/0182984 A1 | 7/2010 | Herscovici et al. | |
| 2012/0044059 A1* | 2/2012 | Saros | H04W 4/02 |
| | | | 340/10.5 |
| 2013/0340656 A1 | 12/2013 | Rainier | |
| 2014/0240084 A1 | 8/2014 | Gropper | |
| 2014/0250499 A1* | 9/2014 | Vercruysse | G06F 21/32 |
| | | | 726/4 |
| 2014/0309860 A1* | 10/2014 | Paulin | B60B 3/165 |
| | | | 701/36 |
| 2015/0007295 A1* | 1/2015 | Hou | H04L 9/3231 |
| | | | 726/7 |
| 2015/0095989 A1* | 4/2015 | An | H04L 63/083 |
| | | | 726/4 |
| 2016/0012515 A1* | 1/2016 | Cronin | G06Q 50/12 |
| | | | 705/15 |
| 2016/0053526 A1 | 2/2016 | Dittrich | |
| 2016/0132659 A1 | 5/2016 | Vaz | |
| 2016/0267738 A1 | 9/2016 | Carstens et al. | |
| 2017/0024693 A1 | 1/2017 | Wiechers | |
| 2017/0197583 A1* | 7/2017 | Izraeli | G08B 25/00 |
| 2018/0276481 A1* | 9/2018 | Bourgeais | G06K 9/66 |

FOREIGN PATENT DOCUMENTS

| | | |
|---|---|---|
| CN | 105991278 A | 10/2016 |
| CN | 106375091 A | 2/2017 |
| FR | 2804994 A1 | 8/2001 |
| FR | 1237445 A1 | 9/2002 |
| FR | 3016385 A1 | 7/2015 |

\* cited by examiner

METHOD AND SYSTEM FOR CONTROLLING A PHYSICAL OBJECT TO BE SHARED BY SEVERAL POTENTIAL USERS

CROSS-REFERENCE TO RELATED APPLICATIONS

This application claims priority to French Patent Application No. 1752301, filed on Mar. 21, 2017, which application is hereby incorporated herein by reference.

TECHNICAL FIELD

Implementations and embodiments of the invention relate to a method and system for controlling a physical object to be shared by several potential users.

BACKGROUND

In recent years, the collaborative economy, notably in the form of the sharing economy, arising from the convergence of digital and social innovation, has been expanding rapidly around the world and is beginning to change the way of life of a large number of people.

With services accessible via dedicated websites, it is possible to share, particularly between individuals, dwellings, offices, cars, boats, second-hand products, etc.

In most cases, this kind of sharing requires a physical meeting between parties, for example the owner of the thing or the agent and at least one user of at least one thing to be shared, for example, to handover an dwelling or car key in person.

In other cases, owners and renters of this kind of sharing can use, for example, a conventional safe accessible by password, to transmit keys or things of high value to be shared.

There is thus a need to propose a system of things to be shared that makes it possible to remotely perform a respective access control for each user, a remote verification of the presence or of the absence of the keys or of the things to be shared in a predetermined place, and a tracking, that can be consulted remotely, of the actual access of each user to these things and of different parameters of the system.

A conventional safe does not allow an administrator to generate a password dedicated to each user without physical intervention on the safe after each use, to authorise given time bands, and to know what user has had access to the safe and the exact moment of the access.

SUMMARY

Embodiments of this disclosure relate to the internet of things, commonly referred to by those skilled in the art by the acronym IoT, and more particularly to systems containing one or more objects connected to an internet network and designed to be shared by several potential users in total security. Embodiment systems allow remote control of the one or more objects, for example control of the placement of and/or access to the one or more objects by these potential users.

According to one aspect, there is proposed a method for controlling at least one object designed to be shared by several users and designed to be deposited in at least one enclosure, in particular secured, for example, a safe, suitable for being in an open state or in a closed state. The method includes detecting the presence or of the absence of the at least one thing in the at least one enclosure in the closed state via a first wireless link, for example, a short-range link, in particular of the "Bluetooth" type, between the object and a reader situated in the enclosure, the first wireless link being contained in the enclosure in the closed state, for example, by using a metal enclosure. The method further includes transmitting, via an internet network and a second link, for example, a long-range link, in particular wireless or Ethernet, between the at least one enclosure and the internet network, of a first information item representative of the presence or of the absence of the at least one object in the enclosure to at least one computer server accessible via a website configured to be managed by an administrator.

The method can, for example, further include managing the access control of the at least one enclosure from the website via the internet network and the second link.

Such a method advantageously allows a centralized management of the access control of the at least one enclosure via a website and a remote tracking of the state of the presence or the absence of the at least one thing to be shared, which makes it possible to offer a time-stamping of each take-over or hand-over of the thing.

As a non-limiting example, the management of the access control can further be performed via a third channel, for example, a telephone link, a mobile internet link, by post, or similar, put in place between the administrator and the actual user of the shared thing.

According to one implementation, managing the access control includes generating a reference opening code of the enclosure and transmitting the reference code to the actual user by the administrator via the third channel, for example, by a text message ("Short Message Service" or SMS), of email, of fax, of mail, or a conversation during a telephone call. Managing the access control may further include entering or receiving an opening code on an input interface coupled to the enclosure, transmitting the opening code to the computer server via the second link and the internet network, and comparing the reference opening code transmitted and the entered opening code received by the computer server so as to obtain an authorization or a refusal to open the at least one enclosure as a function of the result of the comparison. Managing the access control may additionally include transmitting a second information item representative of the authorization or the refusal to the enclosure via the internet network and the second link.

In this way, all the management of the access control is performed from the computer server via the website and the administrator of the system can generate a dedicated reference opening code for each user. Moreover, the period of validity of each reference opening code can also be managed by the administrator.

The reference opening code can, for example, be one or more of a password, a Bluetooth authentication code, an NFC (Near Field Communication) identification code, a barcode, or a QR (Quick Response) code.

According to another implementation, the management of the access control includes recognizing at least one corporeal characteristic of the actual user of the thing.

Advantageously, such a management of the control makes it possible to offer a higher level of security for a more demanding system.

According to this other implementation, managing the access control includes storing at least one reference corporeal characteristic in the at least one computer server via the website, collecting at least one corporeal characteristic on a collection interface coupled to the enclosure, and transmitting the at least one collected corporeal characteristic to the at least one computer server via the second link and the internet network. Managing the access control may further include comparing the at least one reference corporeal characteristic and the at least one collected corporeal characteristic received so as to obtain an authorization or a refusal to open the at least one enclosure as a function of the result of the comparison, and transmitting a second information item representative of the authorization or of the refusal to the enclosure via the internet network and the second link.

For indication but in a non-limiting manner, the at least one reference corporeal characteristic can, for example, include at least one of a voice signature, a facial image, a fingerprint, or an iris print.

According to yet another implementation, the management of the access control further includes detecting the open state or closed state of the at least one enclosure and a transmission of a third information item representative of the open state or closed state after each change from the open state or closed state of the enclosure to the computer server via the second link and the internet network.

Consequently, the administrator of the system can advantageously track the open or closed state of the enclosure remotely at any time. The detection of the presence or of the absence of the at least one thing is performed when the closed state of the enclosure is detected so as to ensure that the detection is indeed performed within the enclosure.

The method can, for example, further includes a detection of at least one physical parameter of the at least one enclosure and a transmission of a fourth information item representative of the at least one physical parameter after each change of the at least one physical parameter, to the computer server via the second link and the internet network.

Such a method allows the administrator to track the different physical parameters of the enclosure remotely. In case of a problem on the enclosure, the administrator can be notified by the computer server.

According to one implementation, the at least one physical parameter may be the temperature, the position, the humidity, or the acceleration of the enclosure, or, when the at least one enclosure includes at least one battery, the level of charge of the at least one battery.

According to one implementation, detecting the presence or of the absence of at least one shared thing further includes a capturing an image of the internal content of the at least one enclosure in the closed state and a transmission of the image to the computer server.

The administrator of the system can advantageously obtain a visual proof that can be consulted remotely concerning the presence or the absence of the at least one thing using this photographing of the internal content of the enclosure.

According to one implementation, the first link is based on one or more of Bluetooth SMART, NFC, IEEE 802.15.1 or radio frequency identification (RFID), and the second link is based on one or more of Long Range Wide Area Network (or LoRa), SigFox, WiFi (IEEE 802.11, Wireless Fidelity), or Ethernet.

It should be noted that it may be preferable to establish the first link based on the Bluetooth SMART technology because of the low consumption and the second link based on the LoRa or SigFox technology because of national range and the low consumption.

According to another aspect, a system is proposed. This system includes at least one enclosure, for example, secured, configured to be in an open state or in a closed state. The system may further include at least one object designed to be shared by several users and designed to be deposited in the at least one enclosure, and at least one computer server accessible via a website configured to be managed by an administrator. The at least one enclosure may include a reader configured to establish a first wireless link between the at least one thing and the reader, the at least one thing being equipped with a module capable of cooperating with the reader via the first wireless link, the enclosure being configured such that the first link remains contained in the enclosure in the closed state. The at least one enclosure may further include a communications circuit configured to establish a second link between the enclosure and an internet network, and a processor configured to detect the presence or the absence of the thing in the enclosure in the closed state via the first link, to transmit a first information item representative of the presence or of the absence to the computer server via the internet network and the second link.

The server can, for example, further be configured to manage the access control of the at least one enclosure from the website via the internet network and the second link.

As a non-limiting example, the server can further be configured to manage the access control via a third channel put in place between the administrator and the actual user of the shared thing.

According to one embodiment, the server is configured to generate a reference opening code of the enclosure and to transmit the reference code to the actual user via the third channel. In this embodiment, the enclosure includes an input interface configured to receive an entry of an opening code, and the processor is configured to transmit the entered opening code to the computer server via the second link and the internet network. The server is further configured to perform a comparison between the transmitted reference code and the entered opening code received so as to obtain an authorization or a refusal to open the at least one enclosure as a function of the result of the comparison, and a transmission of a second information item representative of the authorization or of the refusal to the enclosure via the internet network and the second link.

As a non-limiting example, the reference opening code can, for example, be one or more of a password, a Bluetooth authentication code, an NFC identification code, a barcode, or a QR code.

According to another embodiment, the computer server is further configured to manage the access control of the at least one enclosure via a recognition of at least one corporeal characteristic of an actual user.

According to this other embodiment, the computer server is configured to store, in a memory, at least one reference corporeal characteristic via the website. In this embodiment, the enclosure further includes a collection interface configured to collect the at least one corporeal characteristic, and the processor is configured to transmit the at least one collected corporeal characteristic to the server via the second link and the internet network. The server is further configured to perform a comparison between the at least one reference corporeal characteristic and the at least one collected corporeal characteristic received so as to obtain an authorization or a refusal to open the at least one enclosure as a function of the result of the comparison, and a transmission of a second information item representative of the authorization or of the refusal to the enclosure via the internet network and the second link.

The at least one reference corporeal characteristic can, for example, include at least one of a voice signature, a facial image, a fingerprint, or an iris print.

As an indication but in a non-limiting manner, the at least one enclosure further includes an additional detector, configured to determine the open state or closed state of the enclosure and the processor is further configured to transmit a third information item representative of the open state or closed state after each change from the open state or closed state of the enclosure to the computer server via the second link and the internet network.

According to one embodiment, the at least one physical parameter may be one or more of the temperature, the position, the humidity, or the acceleration of the enclosure, or, when the at least one enclosure includes at least one battery, the level of charge of the at least one battery.

According to one embodiment, the at least one enclosure includes an image-capture device configured to take at least one image of the internal content of the at least one enclosure in the closed state so as to detect the presence or the absence of at least one thing and the processor is configured to transmit, to the computer server, the at least one image taken.

According to one embodiment, the reader is compatible with at least one of Bluetooth SMART, NFC, IEEE 802.15.1, or RFID, and the communications circuit is compatible with at least one of LoRa, SigFox, WiFi, or Ethernet.

As a non-limiting example, the at least one enclosure can, for example, include a metal safe.

It should be noted that such a metal safe advantageously makes it possible to ensure that the first wireless link remains contained in the enclosure in the closed state.

According to another aspect, a microcontroller is proposed incorporating the processor of the system as defined above, for example, the microcontroller marketed by the company STMicroelectronics under the reference STM32.

According to yet another aspect, an integrated circuit is proposed incorporating the reader, for example, compatible with the Bluetooth SMART technology, of the system as defined above, for example, the extension card marketed by the company STMicroelectronics under the reference X-NUCLEO-IDB05A1.

According to yet another aspect, an integrated circuit is proposed incorporating the communications circuit of the system as defined above, for example, the long-range transceiver compatible with the LoRa technology marketed by the company SEMTECH under the reference SX1272 LoRa.

BRIEF DESCRIPTION OF THE DRAWINGS

Other advantages and features of various embodiments will become apparent on studying the details of non-limiting implementations and embodiments, and the attached drawings in which.

DETAILED DESCRIPTION OF ILLUSTRATIVE EMBODIMENTS

Figure 1:
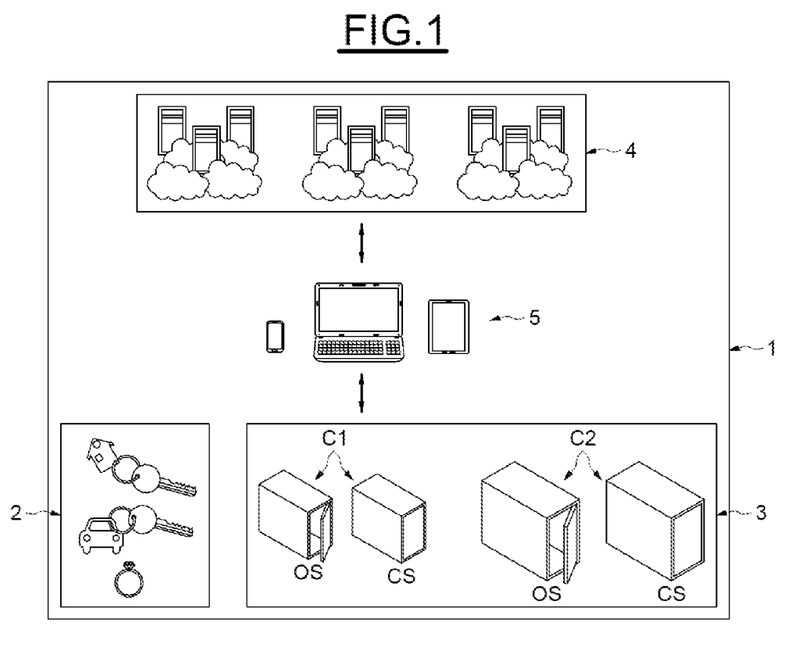
FIGS. 1 to 5 schematically illustrate implementations and embodiments of a system for controlling an object designed to be shared by several potential users.

FIG. 1 schematically illustrates an example of a system 1, according to an embodiment, designed to store at least one physical object 2 to be shared by several users. The object 2 may include a dwelling key, a car key, or a jewel of high value, and the system 1 may be configured to grant an actual user access to each object 2 to be shared under access control.

The system 1 includes at least one enclosure, here a secured enclosure 3, for example, at least one metal safe C1 and C2. Each secured enclosure 3 includes an open state OS and a closed state CS. The system 1 also includes the object 2, for example, at least one rented dwelling key 2, designed to be shared by users, for example, dwelling tenants, and designed to be deposited in the at least one safe 3. The system 1 further includes at least one computer server 4, for example, a cloud computing services server, accessible via a website 5 and configured to be managed by an administrator, for example, an owner of a dwelling intended to be rented out.

It should be noted that each enclosure C1 and C2 can have a different size so as to store the object 2 to be shared that has a size suited to this enclosure. It should also be noted that each computer server 4 can also be accessible via application software 5 (website) developed, for example, for a mobile electronic apparatus such as smartphone or a digital tablet.

The access controls of each safe 3 may be performed by the computer server 4 via the website 5 by using security protocols.

Consequently, the administrator of the system can remotely track the presence or the absence of the object 2 and the open or closed state of each safe 3 via the website 5 without having to physically meet the users.

Figure 2:
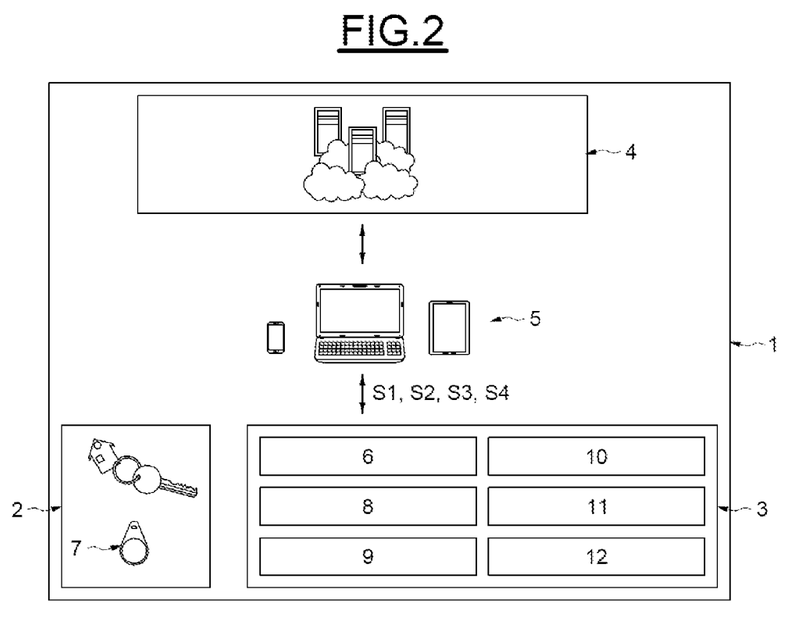

Reference is now made to FIG. 2 to illustrate in more detail an example of the structure of the system 1 according to an embodiment.

For simplicity, the system 1 illustrated in FIG. 2 includes, as a non-limiting example, one metal safe 3, a dwelling key 2 designed to be shared by users and to be deposited in the safe 3, and a cloud computing services server 4 that can be managed remotely by an administrator of the system 1 via an associated website 5.

More specifically, the safe 3 includes a reader 6 configured to establish, between the key 2 and the reader 6, a first wireless link, for example, a short-range wireless link based on the wireless communication technology conforming to the "Bluetooth" version 4.0 and above standard, commonly known to those skilled in the art as "Bluetooth SMART" or "Bluetooth Low Energy." As an indication but in a non-limiting manner, the reader 6 of the system 1 is incorporated in a dedicated integrated circuit, for example, the extension card marketed by the company STMicroelectronics under the reference X-NUCLEO-IDB05A1.

In order to establish the first link, the object 2 is equipped with a module 7, for example, a tag 7 compatible with the "Bluetooth SMART" technology. The energy consumption of this tag 7 and of the reader 6 is advantageously low by virtue of the use of this "Bluetooth SMART" technology.

It should be noted that it is perfectly possible to use other technologies such as near field communication (NFC), the one compatible with the IEEE 802.15.1 standard and that of the radiofrequency identification (RFID) type to establish the first link.

Moreover, the walls of the safe 3 are metal, which makes it possible, in the closed state CS of the safe 3, to completely contain the first wireless link in the safe 3.

Thus, if the safe 3 is closed, it is not possible to detect the object 2 which would be taken in error or fraudulently out of the safe 3.

The safe 3 also includes communications circuit 8 (e.g., communication means 8) configured to establish a second link between the safe 3 and an internet network.

The second link is, in contrast to the first wireless link, based on a long-range communication technology, for example, LoRa or SigFox, so as to obtain fewer constraints on the position of the safe 3 because the LoRa or SigFox network advantageously allows a wide national coverage and low energy consumption. When the safe 3 is placed in a nearby position in a building or in the basement of a building, the second link can be based on a conventional communication technology such as WiFi or Ethernet.

In the case where the second link is based on a wireless communication technology, the communications circuit 8 can further include a communication antenna situated outside the safe 3 (e.g. attached to an outer wall of the safe 3).

It should be noted that the second link is established only when necessary so as to reduce the overall energy consumption of the system 1. By virtue of this low-consumption feature and the use of the technology based on "Bluetooth SMART", the safe 3 can, for example, be powered by a battery, by electrical mains or simply by an Ethernet cable connected to an internet network.

Advantageously, the fact that the safe 3 can be powered by a battery allows for the safe to be installed in a place far from an electrical infrastructure.

As an example, the communications circuit 8 of the system 1 are incorporated in a dedicated integrated circuit, for example the long-range transceiver compatible with the LoRa technology marketed by the company SEMTECH under the reference SX1272 LoRa.

The safe 3 further includes an additional detector 9 (e.g., detection means), for example, a door opening and closure sensor, configured to detect the open state OS or the closed state CS of the safe 3. The safe 3 additionally includes processor 10, a microcontroller of the STM32 type marketed by the company STMicroelectronics. The processor 10 is configured to perform the detection of the presence or the absence of the key 2 in the safe 3 via the first link when the closed state is detected by the additional detector 9 and to transmit to the server 4 a first signal S1 representative of the presence or of the absence of the key 2 in the safe 3.

The safe 3 can further include at least one sensor, for example, a sensor 11, configured to detect at least one physical parameter of the safe 3, for example, the temperature, the position, the humidity, the acceleration, and, when the safe 3 includes at least one battery, the level of charge of each battery.

These physical parameters of the safe 3 are notably useful for the administrator in order to quantitatively track the physical states of the safe 3 and detect any malicious act against the safe 3. The processor 10 is further configured to transmit to the server 4 a fourth signal S4 representative of each physical parameter. The administrator can remotely consult the fourth signal S4 at any moment and receive a notification, even an alert, delivered by the server 4 as soon as an anomaly on each physical parameter is detected.

As an example, the detection of an abrupt acceleration of the safe 3 can provoke a transmission of an alert relating to an attempt to move the safe 3.

The safe 3 also includes an input interface 12, for example, an entry keypad and a display screen, situated, for example, on a front surface of the safe 3 and configured to receive an opening code entered by a user via the entry keypad.

It should be noted that the processor 10 may be configured to activate the reader 6 and the communications circuit 8 only when necessary, that is to say, on exchanges of data with the computer server 4 so as to further reduce the overall energy consumption of the system 1.

Figure 3:
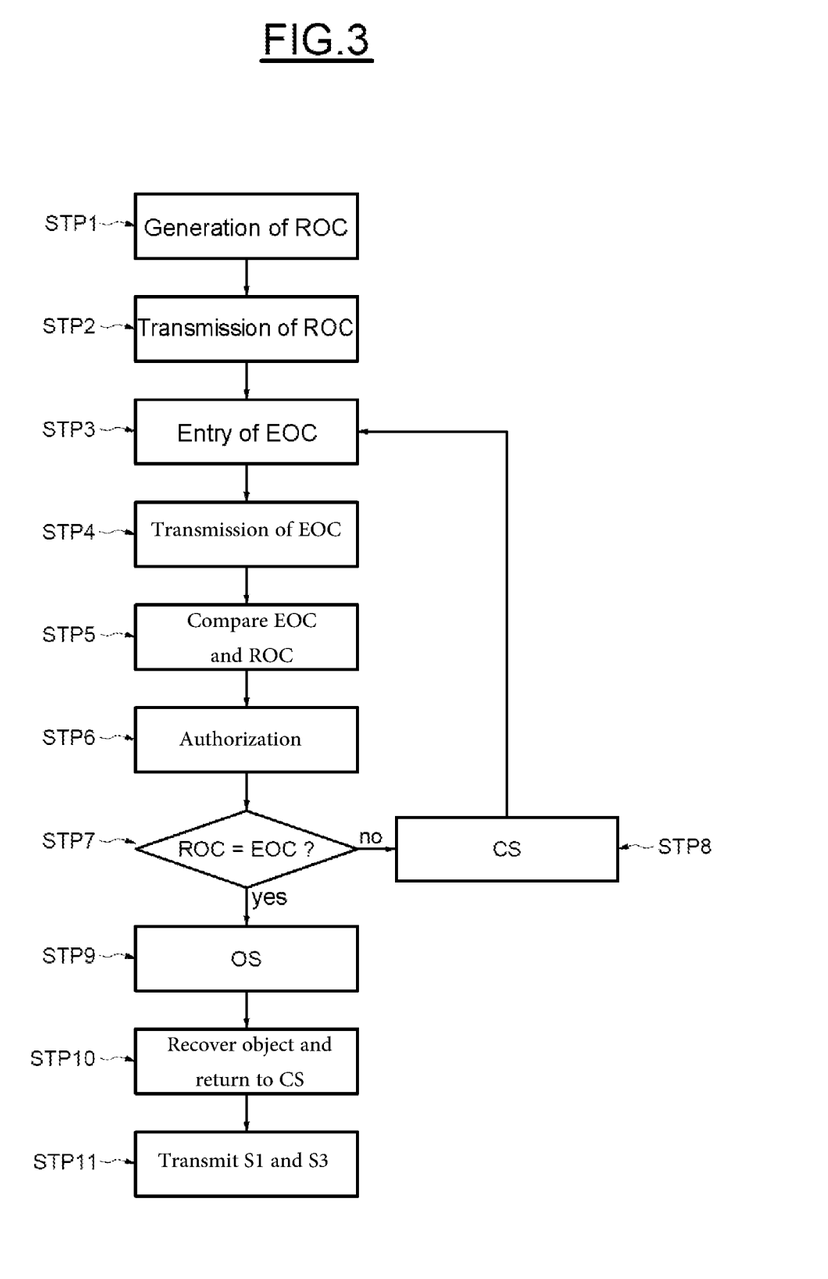

Reference is now made to FIG. 3 to illustrate a method for controlling the key 2 with the system 1 illustrated in FIG. 2.

In a particular case where a tenant would ask the owner to give him or her the key 2 to a rented dwelling in order to have access to this dwelling, the owner can deposit the key 2 beforehand in the safe 3 and perform access control management of the safe 3 via the website 5.

In a first step STP1, a reference opening code ROC dedicated to this user is generated by the computer server 4 at the request of the owner. In other words, each user, here each tenant, can receive his or her own reference opening code ROC, possibly with a period of validity preconfigured by the owner via the computer server 4.

The reference opening code ROC can, for example, be at least one of a password, a Bluetooth authentication code, an NFC identification code, a barcode, or a QR (Quick Response) code.

This reference opening code ROC is then transmitted to the user, for example, via a third channel, for example, a text (Short Message Service, SMS) or an email (STP2).

Having arrived in proximity to the safe 3, the user can enter an opening code EOC on the input interface 12 of the safe 3 in a third step STP3. The processor 10 is configured to transmit the opening code EOC entered by the user to the computer server 4 (STP4) via the second link and the internet network.

The server 4 is then configured to perform a fifth step STP5 of comparing the reference opening code ROC transmitted to the user and the opening code EOC entered by the user and received by the computer server 4.

In the case where the entered opening code EOC is the same as the reference opening code ROC, the server 4 is configured to authorize access to the safe 3. Otherwise, the access to the safe 3 is refused by the server 4 (STP6).

In a seventh step STP7, a second signal S2 representative of the authorization or of the refusal is delivered by the server 4 to the safe 3 so as to grant access to the safe 3 or to display a false code message on the input interface 12.

Moreover, all the attempts to access the safe 3 are stored on the server 4 and can be consulted via the website 5. The owner can, for example, be notified via a text (SMS) or an email after three incorrect attempts to access the safe 3.

It should be noted that all the communications between the safe 3 and the server 4 are secured with conventional security protocols. The access of the administrator to the server 4 is, for example, protected by a conventional password or a dynamic password associated with a mobile phone of the owner.

In the case where the user has incorrectly entered the reference opening code ROC, the request to access the safe 3 is refused by the server 4 and the safe 3 remains in the closed state CS (STP8). The user is then prompted to enter a new opening code again (STP3).

Otherwise, the safe 3 will switch to the open state OS following the reception of the second signal S2 representative of the authorization (STP9). The processor 10 transmits a third signal S3 representative of the open state OS or closed stated CS of the safe 3 to the server 4 so as to signal each change from this open state OS or closed state CS.

The user can then recover the key 2 with its tag 7 and reclose the door of the safe 3 so as to return the safe 3 to the closed state CS (STP10). Since the key 2 with its tag 7 is now outside of the safe 3, the first link can no longer be established between the key 2 with its tag 7 and the safe 3 because the first wireless link remains contained in the safe 3 in the closed state CS.

In this case, the first signal S1 representative of the absence of the key 3 is transmitted by the processor 10 to the server 4 via the second link and the internet network and the third signal S3 representative of the closed state CS is also transmitted to the server 4 in order to update this open state OS or closed state CS of the safe 3 that can be consulted on the website 5 (STP11).

If there are several keys or things to be shared in the safe 3, each key or thing is identified via the first link because each tag has a unique identity number. The administrator can therefore track the presence or the absence of each key or thing to be shared.

Figure 4:
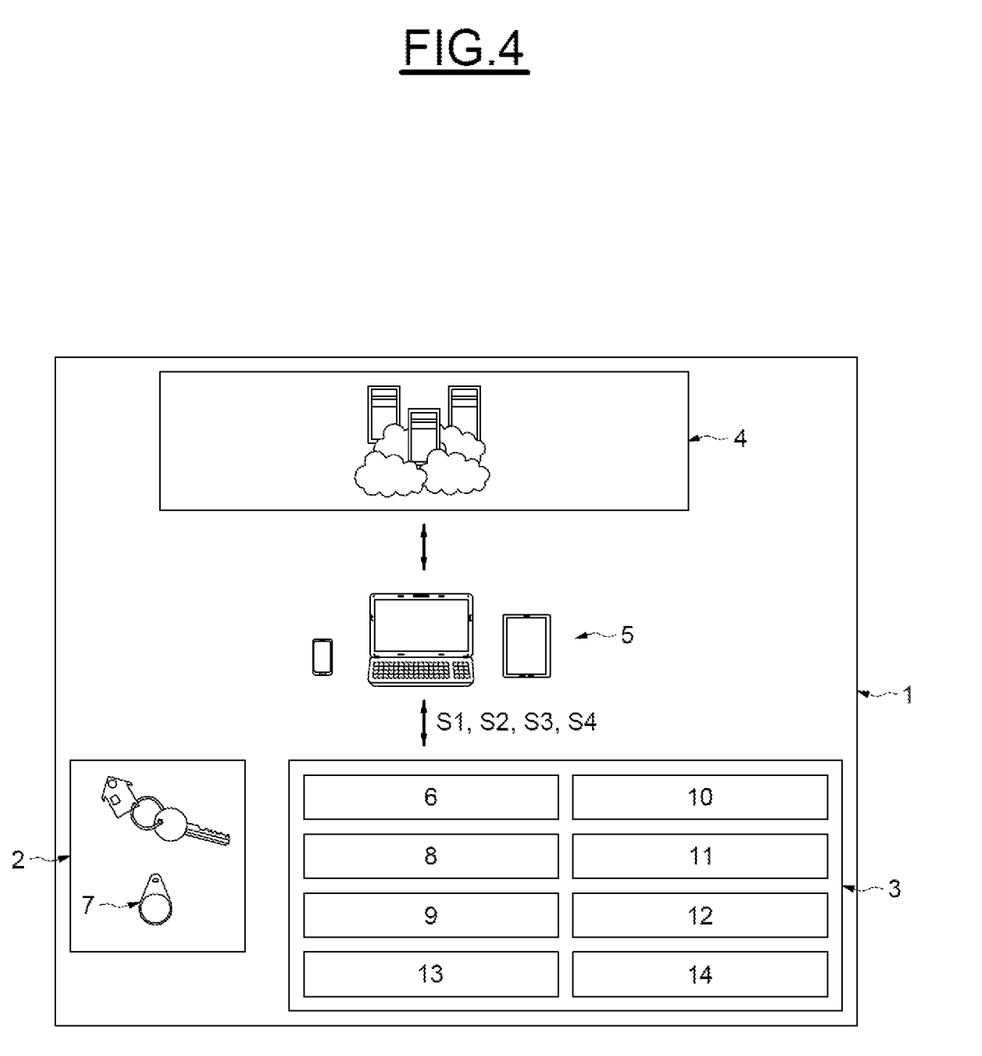

In a variant, to address certain demanding security levels, the safe 3 can include a collection interface 13 in place of or in addition to the input interface 12, and an image-capture device 14, for example, a camera (FIG. 4).

The collection interface 13 is configured to collect at least one corporeal characteristic of the user. As an indication, but in a non-limiting manner, each corporeal characteristic can be the voice, the face, a fingerprint or an iris print of the user.

This collection interface 13 is arranged, for example, on a face of the enclosure 3 or is coupled to this enclosure 3. Its structure is suited to the type of corporeal characteristic collected.

Figure 5:
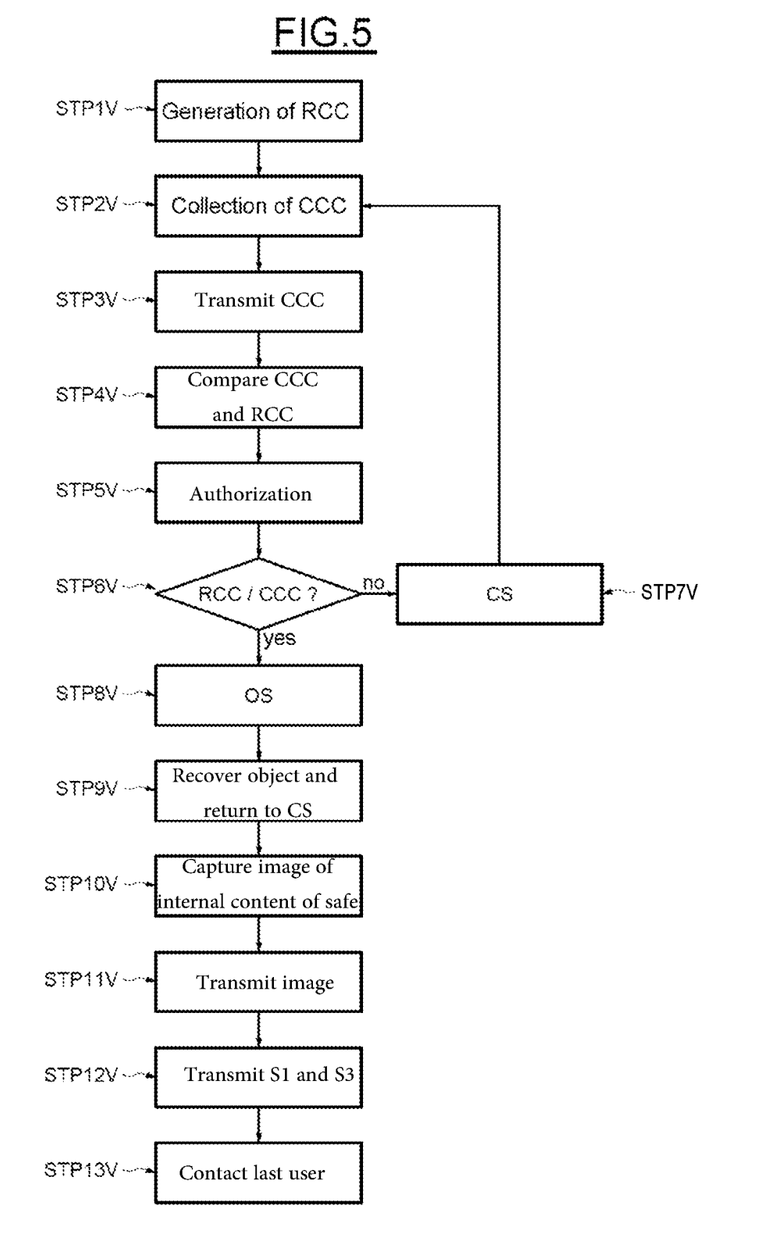

Referring to FIG. 5, there now follows a description of a method for controlling the key 2 with the system 1 according to the embodiment illustrated in FIG. 4.

According to this embodiment and the associated control method, potential users of the system 1 are prompted to pre-store their at least one reference corporeal characteristic RCC in a memory of the computer server 4 (STP1V).

Since each user has his or her own reference corporeal characteristic RCC, a transmission of the reference corporeal characteristic RCC from the server 4 to the user is not therefore necessary.

When a user arrives close to the safe 3, at least one corporeal characteristic CCC of the user can be collected via the collection interface 13 (STP2V).

The processor 10 is then configured to transit to the server 4 each collected corporeal characteristic CCC via the second link and the internet network (STP3V).

A comparison between each reference corporeal characteristic RCC prestored and each collected corporeal characteristic CCC received is performed by the server 4 (STP4V).

The server 4 is further configured to determine an authorization or a refusal to open the safe 3 as a function of the result of the comparison (STP5V).

The second signal S2 representative of the authorization or of the refusal is then delivered by the server 4 to the safe 3 via the second link and the internet network (STP6V).

If the recognition of each corporeal characteristic is not successful on the server 4, the access to the safe 3 is therefore refused and the safe 3 remains in the closed state CS (STP7V). The user is then prompted to begin the step of collection (STP2V) of each corporeal characteristic.

Otherwise, the server 4 authorizes the access to the safe 3 and the safe 3 switches to the open state OS following the reception of the second signal S2 representative of the authorization (STP8V). The processor 10 transmits a third signal S3 representative of the open state OS or closed state CS of the safe 3 to the server 4 so as to signal each change from this open state OS or closed state CS.

The user can then recover the key 2 with its tag 7 and reclose the door of the safe 3 so as to return the safe 3 to the closed state CS (STP9V).

The image-capture device 14 is then configured to take a photo of the internal content of the safe 3 following the closure of the door of the safe 3 (STP10V).

In effect, this image-capture device 14 is configured to remotely provide a real view of the internal content of the safe 3 in a case where the user has taken or returned the tag 7 of the key 3 without the key 3. In other words, the tag 7 has been removed from the key 3.

The processor 10 is further configured to transmit this photo of the internal content to the server 4 via the second link and the internet network, so as to allow the administrator to view this photo and remotely re-check the presence or the absence of the key 2 (STP11V).

In the case of the absence of the key 2 and of the tag 7, the first signal S1 representative of the absence of the key 3 is transmitted by the processor 10 to the server 4 via the second link and the internet network, and the third signal S3 representative of the closed state CS is also transmitted to the server 4 in order to update this open state OS or closed state CS of the safe 3 that can be consulted on the website 5 (STP12V).

In the case of the incomplete presence or absence of the key 2 according to the photo taken by the image-capture device 14, the administrator is prompted to directly contact the last user who has had access to the safe (STP13V). Since the user and the moment of each access are stored and can be consulted on the computer server 4, the administrator can easily identify the last user in question.

Advantageously, in the case of errors including, in a non-limiting manner, the following cases: door of the safe 3 not closed, entered opening code incomplete, unknown tag presented in the safe 3, the processor 10 is further configured to transmit this error information to the server 4 via the second link and the internet network, which allows the administrator to consult and remotely mange manage this error information.

Thus, a system is obtained which includes at least one connected object designed to be shared by several users and designed to be deposited in at least one enclosure, which allows the administrator of the system to remotely track the presence or the absence of each thing, the open or closed state and physical parameters of each enclosure.

Since all the management of the access control is performed via a computer server, it does not require any extensive modification on existing enclosures.

The use of a reader compatible with the "Bluetooth SMART" technology and of communications circuit compatible with technology such as LoRa or SigFOX advantageously makes it possible to obtain greater freedom on the place of installation of the safe and the scope of application of such a system.

Furthermore, through the use of these low-consumption technologies: "Bluetooth SMART", "LoRa" and "SigFox", and the activation of the reader and of the communications circuit only in case of need, such a system consumes very little and can advantageously be powered by a battery. Obviously such a system can also have a hybrid power supply: electrical mains and battery. Moreover, in case of placement of an enclosure outdoors, such a system can advantageously use a battery that can be recharged by photovoltaic panels.

The enclosure may be different from a safe and its metal nature is only a non-limiting example of a structure making it possible to contain a wireless link inside the enclosure. It would, for example, be possible to use a Faraday cage or a meshing embedded in the walls of the enclosure.

What is claimed is:
1. A method comprising:
   having a physical object to be shared by several potential users;
   having an enclosure that has an open state and a closed state, the enclosure allowing access to the physical object in the open state and prohibiting access to the physical object in the closed state;

detecting a presence or an absence of the object in the enclosure in the closed state via a first link between the physical object and a reader situated in the enclosure, the first link being contained in the enclosure in the closed state, the first link being based on a low power short-range wireless communication network technology, wherein detecting the presence or the absence of the physical object comprises capturing an image of an internal content of the enclosure when the enclosure switches from the open state to the closed state and transmitting the image to a computer server;

transmitting a first information item representative of the presence or of the absence of the physical object in the enclosure to the computer server that is remote from the enclosure, via a second link and an internet network, the computer server being accessible via a website configured to be managed by an administrator, the second link being based on a low power wide-area communication network technology; and managing access control of the enclosure from the website via the internet network and the second link and via a third channel between the administrator and an actual user of the physical object, wherein managing access control comprises:

generating a reference opening code of the enclosure, the reference opening code comprising a period of validity preconfigured by the administrator;

transmitting the reference code to the actual user by the administrator via the third channel;

receiving an opening code on an input interface coupled to the enclosure;

transmitting the opening code to the computer server via the second link and the internet network;

comparing, at the computer server, the reference opening code transmitted and the transmitted opening code received by the computer server;

obtaining an authorization or a refusal to open the enclosure as a function of a result of the comparing and a corporeal characteristic of an authorized user of the physical object, and wherein the corporeal characteristic comprises at a voice signature, a facial image, or an iris print; and transmitting, from the computer server to the enclosure, a second information item representative of the authorization or the refusal to the enclosure via the internet network and the second link.

2. The method according to claim 1, wherein the reference opening code comprises a password.

3. The method according to claim 1, wherein managing the access control comprises:

storing a reference corporeal characteristic in the computer server via the website;

collecting corporeal characteristic on a collection interface coupled to the enclosure;

transmitting the collected corporeal characteristic to the computer server via the second link and the internet network;

comparing the reference corporeal characteristic and the collected corporeal characteristic so as to obtain an authorization or a refusal to open the enclosure as a function of a result of the comparing; and transmitting a second information item representative of the authorization or the refusal to the enclosure via the internet network and the second link.

4. The method according to claim 1, wherein managing the access control further comprises detecting the open state or the closed state of the enclosure, and transmitting a third information item representative of the open state or the closed state after each change from the open state or the closed state of the enclosure to the computer server via the second link and the internet network.

5. The method according to claim 1, further comprising detecting a physical parameter of the enclosure, and transmitting a fourth information item representative of the physical parameter after each change of the physical parameter to the computer server via the second link and the internet network.

6. The method according to claim 5, wherein the physical parameter comprises temperature, position, humidity, or acceleration of the enclosure, or a level of charge of a battery of the enclosure.

7. The method according to claim 1, wherein the low power short-range wireless communication network technology comprises Bluetooth SMART, and wherein the low power wide-area wireless communication network technology comprises LoRa, or SigFox.

8. The method according to claim 1, wherein the reference opening code comprises a Bluetooth authentication code.

9. The method according to claim 1, wherein the reference opening code comprises an near field communication (NFC) identification code.

10. The method according to claim 1, wherein the reference opening code comprises a barcode.

11. The method according to claim 1, wherein the reference opening code comprises a quick response (QR) code.

12. A system, comprising:

an enclosure in one of an open state or a closed state, the enclosure configured to store a physical object to be shared by several users;

a reader configured to establish a first link with the physical object, the physical object being equipped with a module configured to cooperate with the reader via the first link, the enclosure being further configured such that the first link remains contained in the enclosure in the closed state, the first link being based on a low power short-range wireless communication network technology;

a communications circuit comprising a long-range transceiver, the communication circuit configured to establish a second link between the enclosure and an internet network, the second link being based on a low power wide-area wireless communication network technology;

a processor configured to detect a presence or an absence of the physical object in the enclosure in the closed state via the first link, and to transmit a first information item representative of the presence or of the absence of the physical object to a computer server, remote from the physical object and the enclosure, via the internet network and the second link, wherein the processor is configured to obtain an authorization or a refusal to open the enclosure as a function of a comparison, at the computer server, between a reference code and an opening code entered by at least one of the several users, wherein all of the components of the reader, the communications circuit, and the processor are disposed within the enclosure;

an image-capture device configured to capture an image of an internal content of the enclosure when the enclosure switches from the open state to the closed state so as to detect the presence or the absence of the object, wherein the processor is configured to transmit the image to the computer server; and a collection interface configured to collect a corporeal characteristic of an authorized user of the enclosure, wherein the corporeal characteristic comprises at a voice signature, a facial image, or an iris print.

13. The system according to claim 12, wherein the enclosure comprises a sensor configured to detect a physical parameter of the enclosure, wherein the processor is further configured to transmit a second information item representative of the physical parameter after each change of the physical parameter to the computer server via the second link and the internet network.

14. The system according to claim 13, wherein the physical parameter comprises temperature, position, humidity, acceleration of the enclosure, or a level of charge of a battery of the enclosure.

15. The system according to claim 12, wherein the reader is compatible with Bluetooth SMART, and wherein the communications circuit is compatible with LoRa, or SigFox.

16. The system according to claim 12, wherein the enclosure comprises a metal safe.

17. The system according to claim 12, wherein the processor comprises a microcontroller.

18. The system according to claim 12, wherein the reader is comprised in an integrated circuit.

19. The system according to claim 12, wherein the communications circuit is comprises in an integrated circuit.

20. A system, comprising:
  an enclosure in one of an open state or a closed state, the enclosure configured to store a physical object to be shared by several users;
  a computer server remote from the enclosure, accessible via a website, and configured to be managed by an administrator;
  a reader configured to establish a first link with the physical object, the physical object being equipped with a module configured to cooperate with the reader via the first link, the enclosure being further configured such that the first link remains contained in the enclosure in the closed state, the first link being based on a low power short-range wireless communication network technology;
  a communications circuit comprising a long-range transceiver, the communication circuit configured to establish a second link between the enclosure and an internet network, the second link being based on a low power wide-area wireless communication network technology; and
  a processor configured to detect a presence or an absence of the physical object in the enclosure in the closed state via the first link, and to transmit a first information item representative of the presence or of the absence of the physical object to the computer server via the internet network and the second link, the computer server being further configured to manage access control of the enclosure from the website via the internet network and the second link, wherein the computer server is further configured to manage the access control via a third channel between the administrator and an actual user of the physical object, wherein the computer server is configured to generate a reference opening code of the enclosure and to transmit the reference opening code to the actual user via the third channel;
  an image-capture device configured to capture an image of an internal content of the enclosure when the enclosure switches from the open state to the closed state so as to detect the presence or the absence of the object, wherein the processor is configured to transmit the image to the computer server;
  a collection interface configured to collect a corporeal characteristic of an authorized user of the enclosure, wherein the corporeal characteristic comprises at a voice signature, a facial image, or an iris print, wherein all components of the reader, the communications circuit, the processor, and the image-capture device are disposed in the enclosure;
  wherein the enclosure comprises an input interface configured to receive an opening code;
  wherein the processor is configured to transmit the opening code to the computer server via the second link and the internet network, the opening code comprising a period of validity preconfigured by the administrator;
  wherein the computer server is further configured to compare the reference opening code and the opening code received so as to obtain an authorization or a refusal to open the enclosure as a function of a result of the comparison; and
  wherein the server is further configured to transmit a second information item representative of the authorization or the refusal to the enclosure via the internet network and the second link.

21. The system according to claim 20, wherein the reference opening code comprises a password, a Bluetooth authentication code, an NFC identification code, a barcode, or a QR code.

22. The system according to claim 20, wherein the computer server is configured to store a reference corporeal characteristic;
  wherein the processor is configured to transmit the collected corporeal characteristic to the server via the second link and the internet network; and
  wherein the computer server is further configured to compare the reference corporeal characteristic and the collected corporeal characteristic so as to obtain an authorization or a refusal to open the enclosure as a function of a result of the comparing, and to transmit a second information item representative of the authorization or the refusal to the enclosure via the internet network and the second link.

23. The system according to claim 20, wherein the enclosure further comprises a detector configured to determine the open state or the closed state of the enclosure, and wherein the processor is further configured to transmit a third information item representative of the open state or the closed state after each change from the open state or the closed state of the enclosure to the computer server via the second link and the internet network.

* * * * *